(12) United States Patent
Mano et al.

(10) Patent No.: US 11,567,368 B2
(45) Date of Patent: Jan. 31, 2023

(54) OPTICAL APPARATUS

(71) Applicant: STANLEY ELECTRIC CO., LTD., Tokyo (JP)

(72) Inventors: Tomohide Mano, Tokyo (JP); Yoshihisa Iwamoto, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/325,464

(22) Filed: May 20, 2021

(65) Prior Publication Data
US 2021/0364837 A1 Nov. 25, 2021

(30) Foreign Application Priority Data
May 22, 2020 (JP) .............................. JP2020-089855

(51) Int. Cl.
*G02F 1/13357* (2006.01)
*G02F 1/01* (2006.01)
*G02F 1/1335* (2006.01)

(52) U.S. Cl.
CPC ........ *G02F 1/13362* (2013.01); *G02F 1/0136* (2013.01); *G02F 1/133536* (2013.01); *G02F 2202/28* (2013.01)

(58) Field of Classification Search
CPC ........... G02F 1/13362; G02F 1/133536; G02F 1/0136; G02F 2202/28; G02F 1/133555; G02F 2203/09; G09G 2300/0456
See application file for complete search history.

(56) References Cited

U.S. PATENT DOCUMENTS

| | | | |
|---|---|---|---|
| 5,686,979 A * | 11/1997 | Weber | E06B 9/24 349/96 |
| 2019/0113790 A1* | 4/2019 | Hakoi | G02F 1/13362 |
| 2020/0012150 A1* | 1/2020 | Watanabe | G02F 1/137 |

FOREIGN PATENT DOCUMENTS

JP 3419766 B2 4/2003

* cited by examiner

*Primary Examiner* — Mariam Qureshi
(74) *Attorney, Agent, or Firm* — Holtz, Holtz & Volek PC (57) ABSTRACT

Provided is an optical apparatus that is capable of switching between a state in which the optical apparatus can reflect light and a state in which the optical apparatus can output light and suppressing deterioration of display quality of a light reflection image. The optical apparatus includes: a light emitting device having a light emitting surface; an absorption type polarizing plate disposed opposite to the light emitting surface of the light emitting device; a liquid crystal optical element disposed between the light emitting device and the absorption type polarizing plate; a reflection type polarizing plate disposed between the light emitting device and the liquid crystal optical element; and an adhesive layer disposed on a surface of the reflection type polarizing plate that faces the light emitting device.

20 Claims, 6 Drawing Sheets

OPTICAL APPARATUS

This application claims the priority benefit under 35 U.S.C. § 119 of Japanese Patent Application No. 2020-089855 filed on May 22, 2020, which is hereby incorporated in its entirety by reference.

TECHNICAL FIELD

The presently disclosed subject matter relates to an optical apparatus having a mirror function and a display function which are switchable from each other.

BACKGROUND ART

Japanese Patent No. 3419766 discloses an apparatus capable of switching between a state in which it can function as a mirror (also referred to as a state in which it can display a mirror image or a state in which it can reflect external light (mirror function)) and a state in which it can function as a display device (also referred to as a state in which it can display a predetermined image or a state in which it can emit display light (display function)). The apparatus includes a display device configured to display a predetermined image, an absorption type polarizing plate disposed opposite to the display device, a liquid crystal optical element disposed between the display device and the absorption type polarizing plate, and a reflection type polarizing plate disposed between the display device and the liquid crystal optical element.

Depending on the fixing method of the reflection type polarizing plate, the apparatus disclosed in Japanese Patent No. 3419766 can have a greatly decreased display quality of a mirror image.

SUMMARY

The presently disclosed subject matter has been devised in view of these and other problems and features in association with the conventional art. According to an aspect of the presently disclosed subject matter, there can be provided an optical apparatus that is capable of switching between a state in which it can reflect light and a state in which it can output light and has as its object the suppression of deterioration in display quality of a light reflection image.

According to another aspect of the presently disclosed subject matter, an optical apparatus configured to be capable of switching between a state in which the optical apparatus can output light and a state in which the optical apparatus can reflect light. The optical apparatus includes: a light emitting device having a light emitting surface; an absorption type polarizing plate disposed opposite to the light emitting surface of the light emitting device; a liquid crystal optical element disposed between the light emitting device and the absorption type polarizing plate; a reflection type polarizing plate disposed between the light emitting device and the liquid crystal optical element; and an adhesive layer disposed on a surface of the reflection type polarizing plate that faces the light emitting device.

According to the optical apparatus with the above-described configuration, it is possible to suppress a decrease in the display quality of the light reflection image.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

Comparative Example

Before describing embodiments of the presently disclosed subject matter, a basic structure and functions of an optical apparatus having a mirror function and a display function which are switchable from each other will be described with reference to a comparative example. It should be noted that such an optical apparatus can be used as a room mirror, a side mirror or similar mirrors for an automobile configured to usually function as a mirror and, as needed, can function as a display device configured to display the cabin temperature, travelling speed, or the like.

Figure 1:
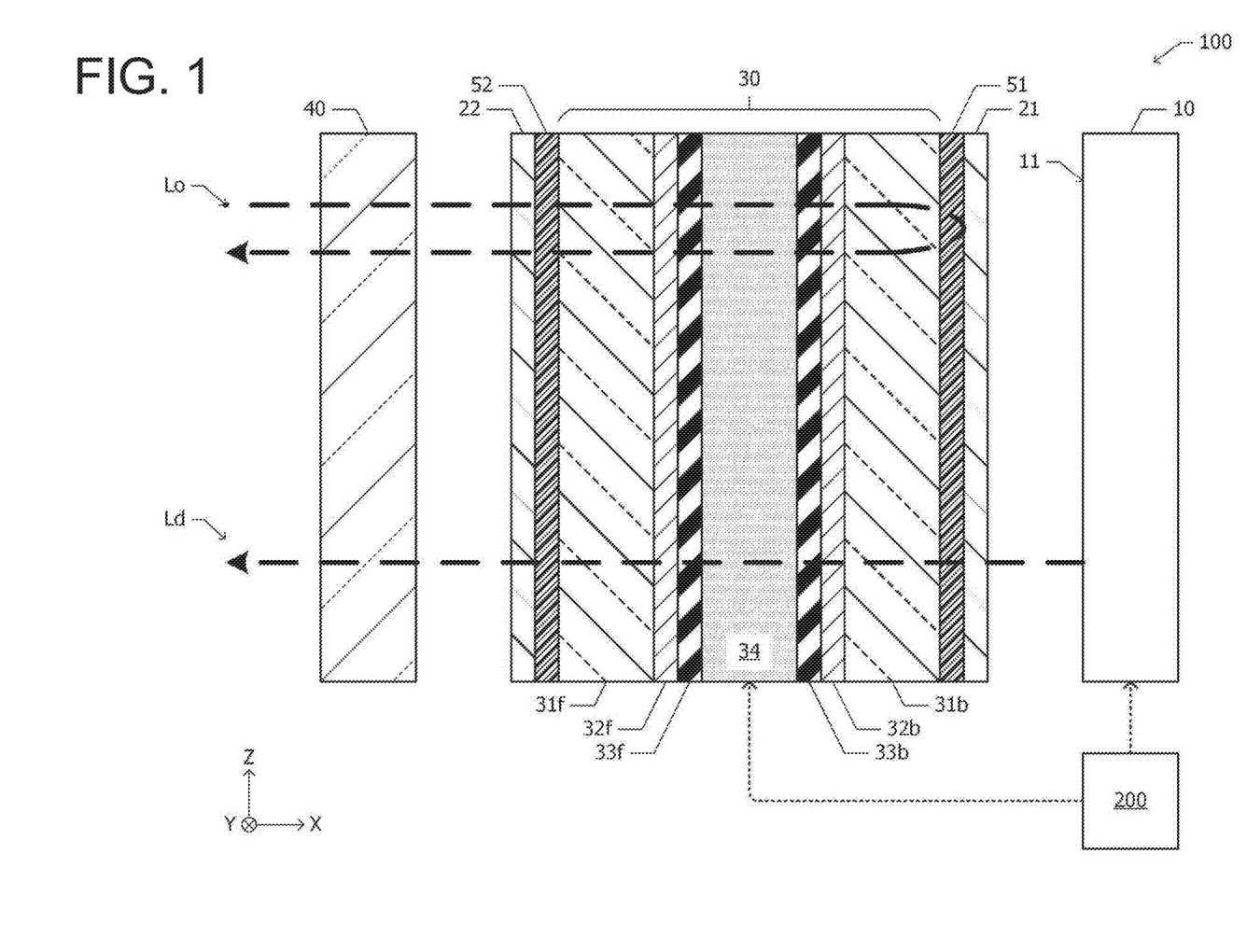
FIG. 1 is a cross-sectional view schematically illustrating an optical apparatus according to a comparative example.

FIG. 1 illustrates an optical apparatus 100 according to a comparative example. With reference to FIG. 1, a description will be first given of the structure of the optical apparatus 100, and then the functions and operations thereof will be described.

Herein, for convenience, the XYZ orthogonal coordinate system consisting of an X-axis and a Y-axis constituting a plane parallel to the horizontal plane, and a Z-axis perpendicular to both the X-axis and Y-axis is defined. Also, in linearly polarized light traveling along the X-axis (electromagnetic wave), linearly polarized light in which the electric field (or magnetic field) oscillates along the Y-axis will be referred to as Y-polarized light, and the linearly polarized light in which the electric field (or magnetic field) oscillates along the Z-axis will be referred to as Z-polarized light.

The optical apparatus 100 includes a display device 10 configured to display characters, images and the like, a reflection type polarizing plate 21 configured to reflect, for example, Y-polarized light while transmitting Z-polarized light, a liquid crystal optical element 30 capable of rotating the vibration direction (polarization direction) of the electric field and the magnetic field in the polarized light, an absorption type polarizing plate 22 configured to absorb, for example, Y-polarized light while transmitting Z-polarized light, and a cover member 40 made of a glass member having a light-transmitting property. These members are arranged in this order.

The display device 10 corresponds to the light emitting device, and for example, is a display device using an organic electroluminescence (EL) element. Further included is a control unit 200, which controls the display of images on a display surface 11 of the display device 10, i.e., controls the output of display light Ld from the display surface 11.

Herein, the display device 10 may be referred to as a light emitting device configured to output display light Ld. The display surface 11 is sometimes referred to as a light outputting surface.

The reflection type polarizing plate 21 can be, for example, a wire grid type polarizing plate or a multilayer film type polarizing plate. The reflection type polarizing plate 21 is, for example, placed in such a manner that its reflection axis is along the Y-axis and its transmission axis is along the Z-axis. In the comparative example, the reflection type polarizing plate 21 is bonded to the liquid crystal optical element 30 (back substrate 31b) via an adhesive layer 51.

The liquid crystal optical element 30 is capable of rotating the polarization direction of polarized light. Specifically, it may be an optical element capable of converting, for example, Z-polarized light into Y-polarized light. The controller 200 controls the rotation of the polarization direction of polarized light transmitted through the liquid crystal optical element 30.

The liquid crystal optical element 30 mainly includes a back substrate 31b and a front substrate 31f which are disposed opposite to each other, a back electrode 32b and a front electrode 32f which are provided on corresponding opposing surfaces of the back substrate 31b and the front substrate 31f, a back orientation film 33b and a front orientation film 33f which are provided on corresponding opposing surfaces of the back electrode 32b and the front electrode 32f, and a liquid crystal layer 34 which is sandwiched between the back orientation film 33b and the front orientation film 33f and contains liquid crystal molecules which possess a differing refractive index (dielectric constant) depending on the direction.

The back substrate 31b and the front substrate 31f may be made of, for example, a glass substrate having a light-transmitting property. The back electrode 32b and the front electrode 32f may be made of, for example, a light-transmitting conductive member containing indium tin oxide.

The back orientation film 33b and the front orientation film 33f may be made of, for example, polyimide, which has been subjected to a monoaxial orientation treatment by rubbing, for example. The back orientation film 33b is subjected to a monoaxial orientation treatment along the Y axis, for example, and the front orientation film 33f is subjected to a monoaxial orientation treatment along the Z axis, for example.

The liquid crystal layer 34 may be made of, for example, a twisted nematic type liquid crystal material.

When no voltage is applied to the liquid crystal layer 34 (normal state), the liquid crystal molecules located in the vicinity of the back orientation film 33b are aligned along the Y-axis, and the liquid crystal molecules located in the vicinity of the front orientation film 33f are aligned along the Z-axis. Then, the liquid crystal molecules located between the back orientation film 33b and the front orientation film 33f are oriented so as to be twisted by about 900 from the back orientation film 33b toward the front orientation film 33f.

When a voltage is applied to the liquid crystal layer 34 via the back electrode 32b and the front electrode 32f (drive state), the liquid crystal molecules having been oriented substantially parallel to the YZ plane are oriented along the X-axis. That is, the liquid crystal molecules are oriented substantially perpendicularly to the back electrode 32b and the front electrode 32f.

In the normal state, the liquid crystal optical element 30 rotates the polarization direction of the polarized light being transmitted therethrough. That is, for example, when Z-polarized light enters, Y-polarized light is outputted. Further, in the drive state, the liquid crystal optical element 30 does not rotate the polarization direction of the polarized light being transmitted therethrough. That is, for example, when Z-polarized light enters, Z-polarized light is outputted as it is.

The absorption type polarizing plate 22 may be made of, for example, a dye-containing or iodine-containing polarizing plate. The absorption type polarizing plate 22 is disposed, for example, so that its absorption axis is along the Y-axis and its transmission axis is along the Z-axis. In the comparative example, the absorption type polarizing plate 22 is bonded to the liquid crystal optical element 30 (in particular, to the front substrate 31f) via an adhesive layer 52.

The adhesive layers 51 and 52 are each composed of an adhesive having a light-transmitting property. The thickness of the adhesive layers 51 and 52 is, for example, about 5 to 10 μm.

A description will now be given of the functions and operations of the optical apparatus 100 according to the comparative example. First, a case where the optical apparatus 100 functions as a display equipment will be described, and then a case where it functions as a mirror will be described.

The optical apparatus 100 can function as a display equipment when an image is displayed on the display surface 11 of the display device 10 and voltage is applied to the liquid crystal layer 34 to drive the liquid crystal optical element 30.

When display light Ld emitted from the display device 10 is incident on the reflection type polarizing plate 21, only Z-polarized light of the display light Ld can enter and be transmitted through the reflection type polarizing plate 21. Then, the Z-polarized light transmitted through the reflection type polarizing plate 21 enters the liquid crystal optical element 30 in the drive state, and it is allowed to transmit through the liquid crystal optical element 30 as it is without the polarization direction being rotated. The Z-polarized light transmitted through the liquid crystal optical element 30 is further allowed to transmit through the absorption type polarizing plate 22 and the cover member 40, so as to reach observers. As a result, the observer can visually observe the display light Ld emitted from the display device 10, that is, the image displayed on the display surface 11.

On the other hand, the optical apparatus 100 can function as a mirror when an image is not displayed on the display surface 11 of the display device 10 and no voltage is applied to the liquid crystal layer 34 to cause the liquid crystal optical element 30 to be in the normal state.

When external light Lo having transmitted through the cover member 40 is incident on the absorption type polarizing plate 22, only Z-polarized light of the external light Lo can enter and be transmitted through the absorption type polarizing plate 22. Then, as the Z-polarized light transmitted through the absorption type polarizing plate 22 enters the liquid crystal optical element 30 in the normal state, in particular, the liquid crystal layer 34 thereof, it is converted into Y-polarized light during transmission through the liquid crystal layer 34.

The Y-polarized light having been converted by the liquid crystal layer 34 is then incident on the reflection type polarizing plate 21, and cannot enter but is reflected by the reflection type polarizing plate 21. Then, the Y-polarized light having been reflected by the reflection type polarizing plate 21 enters the liquid crystal layer 34, and is converted into Z-polarized light again. The Z-polarized light having been once more converted by the liquid crystal layer 34 is further allowed to transmit through the absorption type polarizing plate 22 and the cover member 40, so as to reach observers. As a result, the observer can visually observe the light reflection image (mirror image) by the reflection type polarizing plate 21.

The light reflection image by the reflection type polarizing plate 21 preferably has neither distortion nor defect or the like. However, during attachment of the reflection type polarizing plate 21 to the liquid crystal optical element 30 via the adhesive layer 51, a foreign matter such as dirt and dust may become caught between the reflection type polarizing plate 21 and the liquid crystal optical element 30 (i.e., between the adhesive layer 51 and the back substrate 31b), such a foreign matter may be observed as a defect of the light reflection image in some cases.

Figure 2:
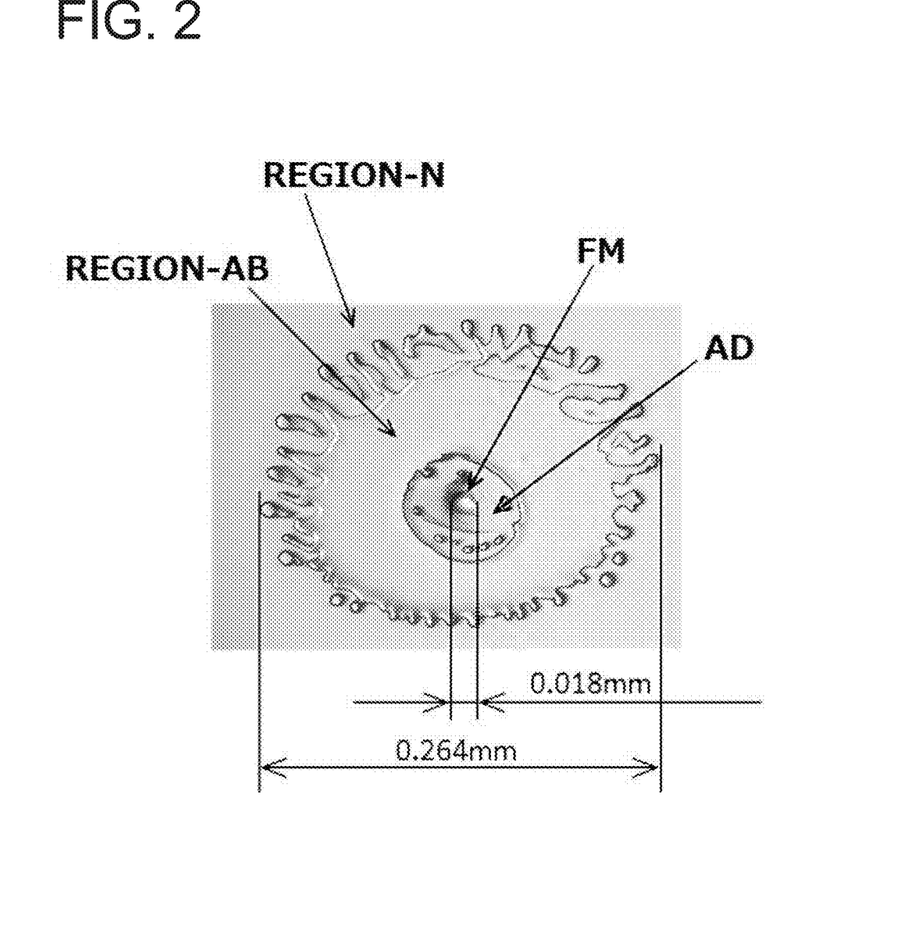
FIG. 2 is a microgram showing the disadvantages that can be developed in a light reflection image in the comparative example.

FIG. 2 is a microgram showing the adhesive layer and the back substrate with a foreign matter introduced therein. In this drawing, the sign FM represents the foreign matter, the sign REGION-N represents a region where the adhesive layer 51 and the back substrate 31b are normally bonded to each other, the sign REGION-AB represents a region where the adhesive layer 51 and the back substrate 31b are abnormally separated in part due to the foreign matter to generate bubbles, and the sign AD represents the adhesive that gathers around the foreign matter as a nucleus. Thus, FIG. 2 illustrates a state in the comparative example, in which there is a defect in a light reflection image observed from the liquid crystal optical element 30 side, the defect appearing when a foreign matter is caught between the reflection type polarizing plate 21 and the liquid crystal optical element 30. When a foreign matter is caught between the reflection type polarizing plate 21 and the liquid crystal optical element 30, it may lead to a section where the adhesive layer 51 is relatively thicker or thinner, a section where the reflection type polarizing plate 21 or the liquid crystal optical element 30 is separated from the adhesive layer 51 (due to bubbles or the like caught therein), or the like occurring around the foreign matter. In this case, there is a possibility of a defect of 10 times or more the size of the actual foreign matter appearing in the light reflection image.

The optical apparatus 100 is desirably limited from developing such a defect occurred. Even if it were to occur, it is preferable to limit at least the size of the defect to the same size as that of the actual foreign matter so as not to be noticeable. Hereinafter, an exemplary embodiment of an optical apparatus in which such a defect of a light reflection image is made less noticeable will be described.

First Exemplary Embodiment

Figure 3:
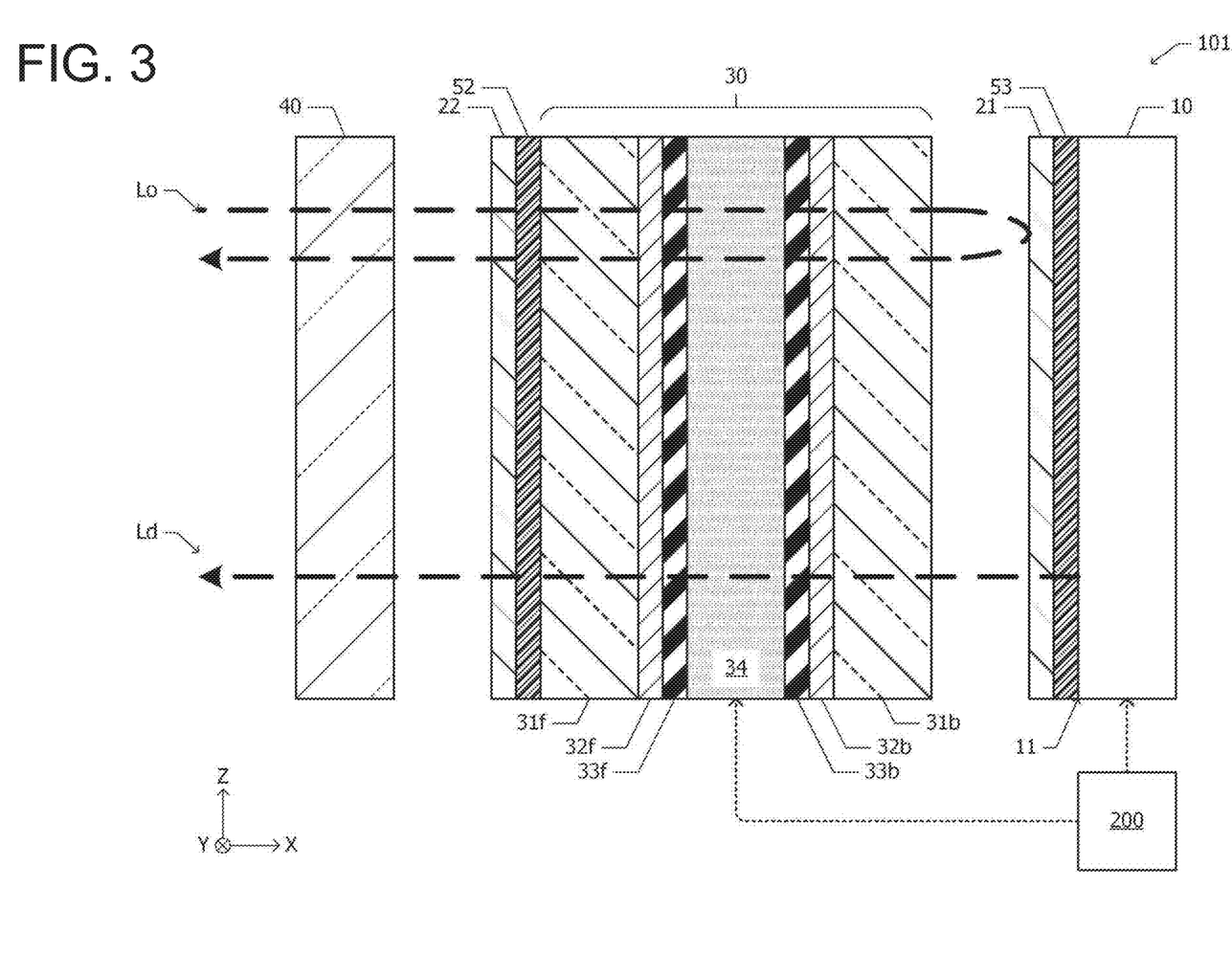
FIG. 3 is a cross-sectional view schematically illustrating an optical apparatus according to a first exemplary embodiment made in accordance with principles of the presently disclosed subject matter.

FIG. 3 illustrates a structure of an optical apparatus 101 according to a first exemplary embodiment. The optical apparatus 101 according to the first exemplary embodiment has the same structure and configuration as those of the optical apparatus 100 according to the comparative example, except for the fixing method of the reflection type polarizing plate 21.

In the optical apparatus 101, the reflection type polarizing plate 21 is bonded to the display surface 11 of the display device 10. An adhesive layer 53 is applied to the surface of the reflection type polarizing plate 21 facing the display device 10, so that the reflection type polarizing plate 21 and the display device 10 are bonded to each other via the adhesive layer 53.

In the first exemplary embodiment, the polarized light reflected by the reflection type polarizing plate 21 does not pass through the adhesion interface between the reflection type polarizing plate 21 and the display device 10, or the adhesive layer 53 that bonds them. Therefore, even when a foreign matter is caught between the reflection type polarizing plate 21 and the display device 10, a defect corresponding to a foreign matter, bubbles in the adhesive layer 53 caused by the foreign matter, or the like does not appear in the light reflection image.

As described above, the adhesive layer 53 is disposed on the surface of the reflection type polarizing plate 21 facing the display device 10, whereby the adverse effects which foreign matters that can be caught into the adhesive layer 53 pose on the light reflection image can be reduced. As a result, it is possible to minimize the deterioration of the display quality of the light reflection image by making the defect of the light reflection image involving the caught foreign matter to be less noticeable.

Second Exemplary Embodiment

In the first exemplary embodiment, the reflection type polarizing plate 21 is attached to the display device 10. The reflection type polarizing plate 21 may be attached to a separately prepared light-transmitting plate. Hereinafter, an optical apparatus as a second exemplary embodiment in which the reflection type polarizing plate 21 is attached to the light-transmitting plate will be described.

Figure 4:
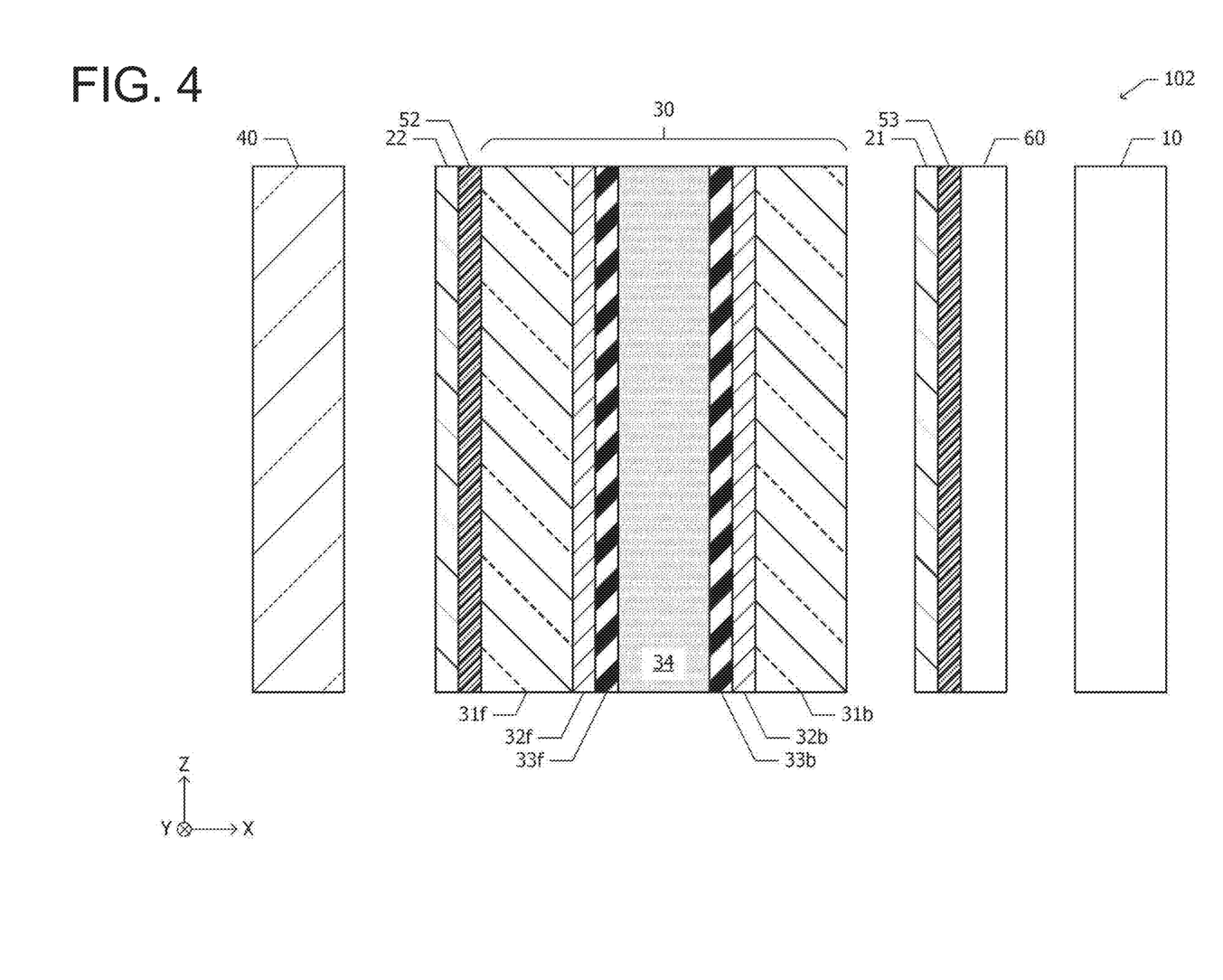
FIG. 4 is a cross-sectional view schematically illustrating an optical apparatus according to a second exemplary embodiment.

FIG. 4 illustrates the structure of an optical apparatus 102 according to the second exemplary embodiment. The optical apparatus 102 according to the second exemplary embodiment has the same structure and configuration as those of the optical apparatus 101 according to the first exemplary embodiment, except for the fixing method of the reflection type polarizing plate 21.

In the optical apparatus 102, the reflection type polarizing plate 21 is bonded to a light-transmitting plate 60. An adhesive layer 53 is disposed on the surface of the reflection type polarizing plate 21 facing the display device 10, so that the reflection type polarizing plate 21 and the light-transmitting plate 60 are bonded to each other via the adhesive layer 53.

The light-transmitting plate 60 may be made of, for example, a glass member having a light-transmitting property. It should be noted that the light-transmitting plate 60 may be an optional member as long as it has a light-transmitting property and can support the reflection type polarizing plate 21.

The reflection type polarizing plate 21 may be fixed in this manner. Use of a relatively thick light-transmitting plate 60 can increase the rigidity of the entire optical apparatus 102.

Third Exemplary Embodiment

In the first and second exemplary embodiments, the display device 10 utilizes an organic EL element exemplified as a unit configured to display a desired image. A light emitting device including a liquid crystal display element may be used as the unit configured to display a desired image. Hereinafter, an optical apparatus as a third exemplary embodiment in which a light emitting device including a liquid crystal display element will be described.

Figure 5:
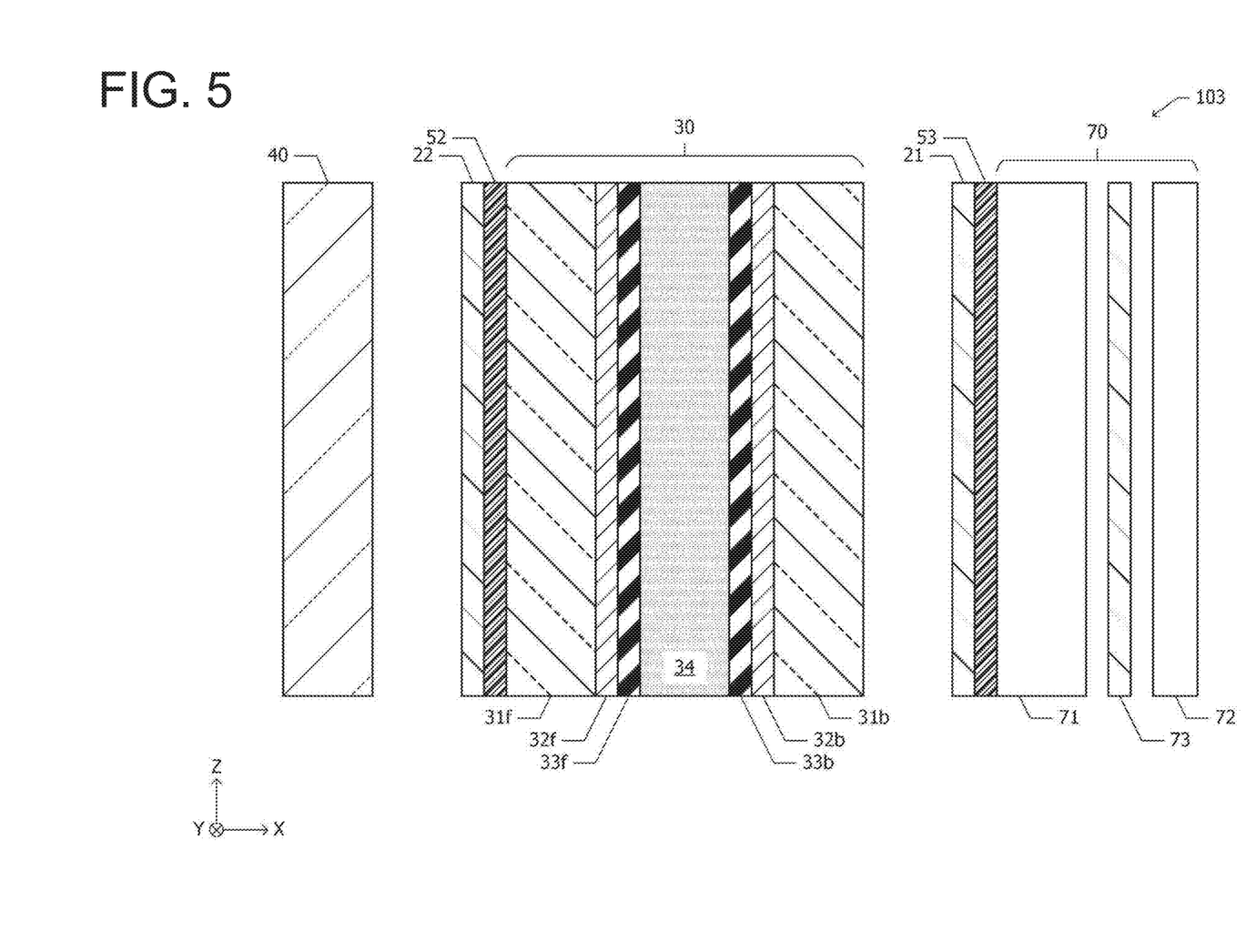
FIG. 5 is a cross-sectional view schematically illustrating an optical apparatus according to a third exemplary embodiment.

FIG. 5 illustrates the structure of an optical apparatus 103 according to a third exemplary embodiment. The optical apparatus 103 according to the third exemplary embodiment has the same structure and configuration as those of the optical apparatus 101 according to the first exemplary embodiment, except that the display device 10 is replaced with a light emitting device 70.

The optical apparatus 103 uses the light emitting device 70 instead of the display device 10. The light emitting device 70 includes a liquid crystal display element 71 that is to be bonded to the reflection type polarizing plate 21, a light source 72 configured to irradiate the liquid crystal display element 71 with light, and a polarizing film 73 disposed between the liquid crystal display element 71 and the light source 72.

The liquid crystal display device 71 has an electrode structure such as a 7-segment type structure, a dot-matrix type structure, or the like. The liquid crystal display device 71 is driven by a driving method such as a VA (Vertical Alignment) method, an IPS (In Plane Switching) method, or the like. The polarizing film 73 is disposed, for example, in a cross Nicol arrangement with respect to the reflection type polarizing plate 21. The light emitting device 70 functions as a unit configured to display an image in combination with the reflection type polarizing plate 21.

Thus, instead of the display device 10, the light emitting device 70 which functions as a unit configured to display images in combination with the reflection type polarizing plate 21 may be used.

Modification

Figure 6:
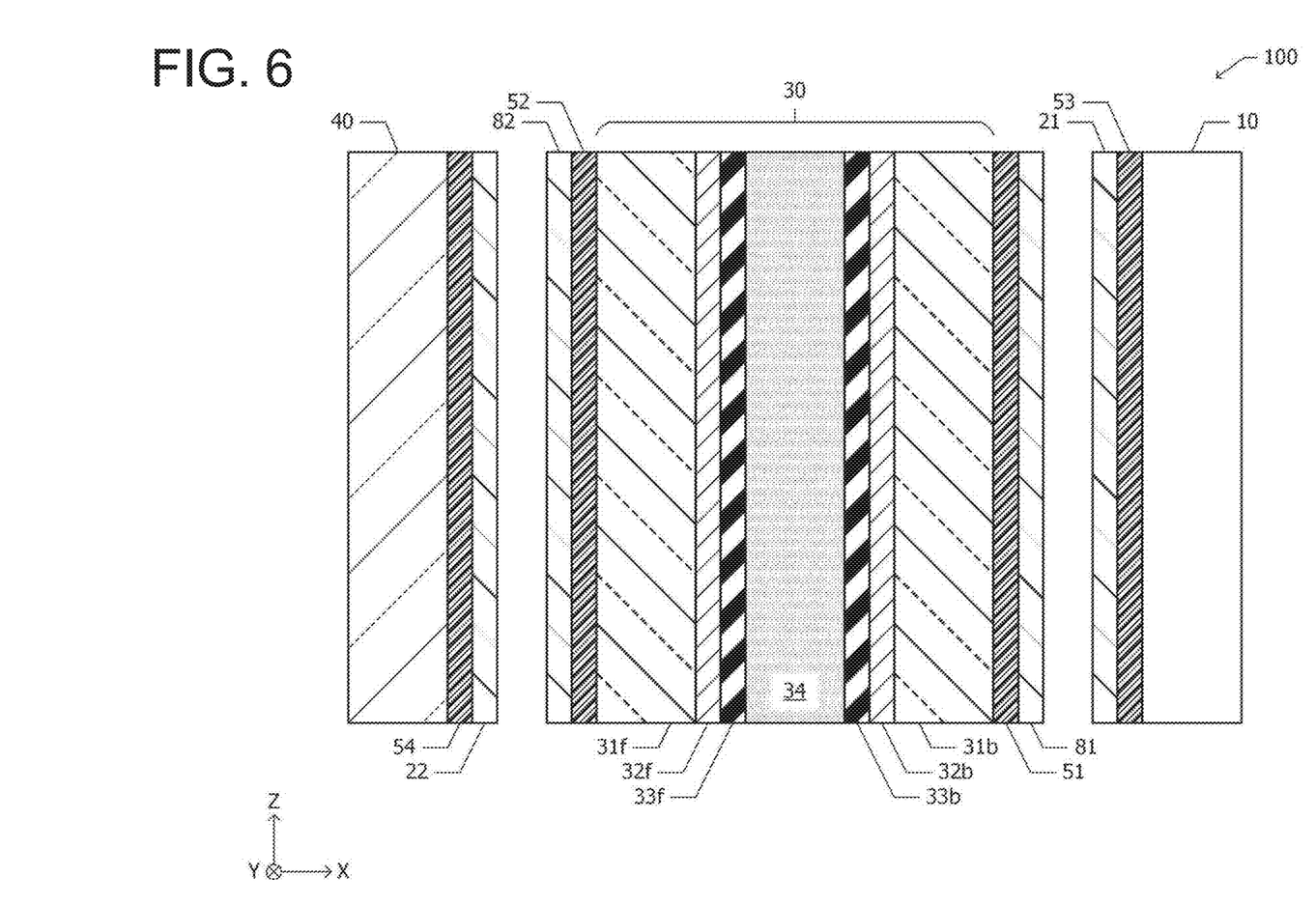
FIG. 6 is a cross-sectional view schematically illustrating an optical apparatus according to a modified example of the first exemplary embodiment.

FIG. 6 illustrates an optical apparatus 104 according to a modification of the first exemplary embodiment. It should be noted that the present modification can also be applied to the second and the third exemplary embodiments.

In the first exemplary embodiment, the reflection type polarizing plate 21 is attached to the display device 10. In this case, an optical film 81 such as a viewing angle compensation film or an anti-glare film may be attached to the liquid crystal optical element 30.

Usually, such an optical film 81 is superimposed on the reflection type polarizing plate 21 and then is attached to the liquid crystal optical element 30. The optical film 81 and the reflection type polarizing plate 21 generally has flexibility or ductility. When they are superimposed on each other and attached to the liquid crystal optical element 30, the flatness of the reflection type polarizing plate 21 is impaired, and there is a possibility of distorted light reflection images due to the reflection type polarizing plate 21.

When the optical film 81 and the reflection type polarizing plate 21 are independently attached to separate members, the flatness of the reflection type polarizing plate 21 can be maintained. In addition, it is possible to prevent distortion of the light reflected image by the reflection type polarizing plate 21. As the method of attaching the optical film, a method of attaching the optical film 81 and the reflection type polarizing plate 21 to separate members is easier than the method of superimposing the optical film 81 on the reflection type polarizing plate 21 and attaching them to the same member.

In the first exemplary embodiment, the absorption type polarizing plate 22 is attached to the liquid crystal optical element 30. However, the absorption type polarizing plate 22 may be attached to the cover member 40 rather than the liquid crystal optical element 30.

In this case, an optical film 82 such as a viewing angle compensation film, an anti-glare film, or the like may be attached to the liquid crystal optical element 30. As described above, as the method of attaching the optical film, a method of attaching the optical film 82 and the reflection type polarizing plate 22 to separate members is easier than the method of superimposing the optical film 82 on the reflection type polarizing plate 22 and attaching them to the same member. It should be noted that, the absorption type polarizing plate 22 may be attached to the liquid crystal optical element 30 while the optical film 82 may be attached to the cover member 40.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. An optical apparatus configured to be capable of switching between a state in which the optical apparatus can output light and a state in which the optical apparatus can reflect light, the optical apparatus comprising:
    a structure including, in order from a rear side of the optical apparatus:
        a light emitting device having a light emitting surface through which display light is outputted;
        a transmission/reflection type polarizing plate configured to allow only a certain polarized light of the display light in a first predetermined direction to be transmitted therethrough;
        a liquid crystal optical element configured to be capable of rotating a polarization direction of the polarized light which is transmitted therethrough; and
        an absorption type polarizing plate configured to have an absorption axis along a second predetermined direction different from the first predetermined direction and to be disposed so as to allow a light of the display light having been transmitted through the transmission/reflection type polarizing plate and the liquid crystal optical element to be transmitted therethrough; and
    a controller configured to control rotation of the polarization direction of the polarized light transmitted through the liquid crystal optical element so as to control between (i) a first state in which the display light outputted from the light emitting device is transmitted through the transmission/reflection type polarizing plate, the liquid crystal optical element, and the absorption type polarizing plate, in this order, and (ii) a second state in which light having been transmitted through the absorption type polarizing plate and the liquid crystal optical element is reflected by the transmission/reflection type polarizing plate and then is transmitted through the liquid crystal optical element and the absorption type polarizing plate such that the reflected light is observable from a side of the optical apparatus near the absorption type polarizing plate,
    wherein:
    the transmission/reflection type polarizing plate includes an adhesive layer disposed on one surface side of the transmission/reflection type polarizing plate, the one surface side being opposite to a side of the transmission/reflection type polarizing plate that is closer to the liquid crystal optical element,
    the optical apparatus further comprises a light-transmitting plate disposed between the light emitting device and the adhesive layer, the adhesive layer bonding only the transmission/reflection type polarizing plate and the light-transmitting plate so as to form an integrated body as a separate member separate from both the liquid crystal optical element and the light emitting device, in the second state, the optical apparatus functions as a mirror that reflects external light, which enters the optical apparatus from a side of the absorption type polarizing plate, by the transmission/reflection type polarizing plate without being transmitted through the adhesive layer, and in the first state, the optical apparatus functions as a display equipment that displays the display light having passed through the adhesive layer.

2. The optical apparatus according to claim 1, further comprising an optical film attached to a surface of the liquid crystal optical element, the surface facing to the transmission/reflection type polarizing plate.

3. The optical apparatus according to claim 2, wherein the light emitting device includes:
   a liquid crystal display element configured to face to the transmission/reflection type polarizing plate;
   a light source configured to irradiate the liquid crystal display element with light; and
   a polarizing film disposed between the liquid crystal display element and the light source.

4. The optical apparatus according to claim 3, wherein the light-transmitting plate is a separately prepared member that has a light-transmitting property and that is configured to support the transmission/reflection type polarizing plate via the adhesive layer.

5. The optical apparatus according to claim 3, wherein the integrated body consists of the light-transmitting plate, the transmission/reflection type polarizing plate, and the adhesive layer provided between the light-transmitting plate and the transmission/reflection type polarizing plate.

6. The optical apparatus according to claim 3, wherein the integrated body is separated from both the liquid crystal optical element and the light emitting device via respective air layers.

7. The optical apparatus according to claim 3, wherein no adhesive layer intervenes between the integrated body and the liquid crystal optical element or between the integrated body and the light emitting device.

8. The optical apparatus according to claim 2, wherein the light-transmitting plate is a separately prepared member that has a light-transmitting property and that is configured to support the transmission/reflection type polarizing plate via the adhesive layer.

9. The optical apparatus according to claim 2, wherein the integrated body consists of the light-transmitting plate, the transmission/reflection type polarizing plate, and the adhesive layer provided between the light-transmitting plate and the transmission/reflection type polarizing plate.

10. The optical apparatus according to claim 2, wherein the integrated body is separated from both the liquid crystal optical element and the light emitting device via respective air layers.

11. The optical apparatus according to claim 2, wherein no adhesive layer intervenes between the integrated body and the liquid crystal optical element or between the integrated body and the light emitting device.

12. The optical apparatus according to claim 1, wherein the light emitting device includes:
    a liquid crystal display element configured to be opposite to the transmission/reflection type polarizing plate;
    a light source configured to irradiate the liquid crystal display element with light; and
    a polarizing film disposed between the liquid crystal display element and the light source.

13. The optical apparatus according to claim 12, wherein the light-transmitting plate is a separately prepared member that has a light-transmitting property and that is configured to support the transmission/reflection type polarizing plate via the adhesive layer.

14. The optical apparatus according to claim 12, wherein the integrated body consists of the light-transmitting plate, the transmission/reflection type polarizing plate, and the adhesive layer provided between the light-transmitting plate and the transmission/reflection type polarizing plate.

15. The optical apparatus according to claim 12, wherein the integrated body is separated from both the liquid crystal optical element and the light emitting device via respective air layers.

16. The optical apparatus according to claim 12, wherein no adhesive layer intervenes between the integrated body and the liquid crystal optical element or between the integrated body and the light emitting device.

17. The optical apparatus according to claim 1, wherein the light-transmitting plate is a separately prepared member that has a light-transmitting property and that is configured to support the transmission/reflection type polarizing plate via the adhesive layer.

18. The optical apparatus according to claim 1, wherein the integrated body consists of the light-transmitting plate, the transmission/reflection type polarizing plate, and the adhesive layer provided between the light-transmitting plate and the transmission/reflection type polarizing plate.

19. The optical apparatus according to claim 1, wherein the integrated body is separated from both the liquid crystal optical element and the light emitting device via respective air layers.

20. The optical apparatus according to claim 1, wherein no adhesive layer intervenes between the integrated body and the liquid crystal optical element or between the integrated body and the light emitting device.

* * * * *